(12) United States Patent
Stieglitz et al.

(10) Patent No.: US 11,485,185 B2
(45) Date of Patent: Nov. 1, 2022

(54) MULTI-POINT LINK FOR A CHASSIS OF A MOTOR VEHICLE

(71) Applicant: ZF FRIEDRICHSHAFEN AG, Friedrichshafen (DE)

(72) Inventors: Andre Stieglitz, Osnabrück (DE); Ingolf Müller, Minfeld (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 6 days.

(21) Appl. No.: 17/266,364

(22) PCT Filed: Jul. 10, 2019

(86) PCT No.: PCT/EP2019/068470
§ 371 (c)(1),
(2) Date: Feb. 5, 2021

(87) PCT Pub. No.: WO2020/030369
PCT Pub. Date: Feb. 13, 2020

(65) Prior Publication Data
US 2021/0316584 A1 Oct. 14, 2021

(30) Foreign Application Priority Data
Aug. 8, 2018 (DE) .................... 10 2018 213 322.0

(51) Int. Cl.
*B60G 7/00* (2006.01)
*F16C 7/02* (2006.01)

(52) U.S. Cl.
CPC .............. *B60G 7/001* (2013.01); *F16C 7/026* (2013.01); *B60G 2206/011* (2013.01);
(Continued)

(58) Field of Classification Search
CPC ........ B60G 2206/013; B60G 2206/014; B60G 2206/011; B60G 2206/012;
(Continued)

(56) References Cited

U.S. PATENT DOCUMENTS

| 2004/0045762 A1 | 3/2004 | Budde et al. |
| 2005/0011592 A1* | 1/2005 | Smith ................ B60G 21/0551 148/519 |

(Continued)

FOREIGN PATENT DOCUMENTS

| DE | 202010006303 | 8/2010 |
| DE | 102010053843 | 6/2012 |

(Continued)

OTHER PUBLICATIONS

Reese , Landing Gear Part E.g. Wishbone, for Motor Vehicle . . . , Mar. 20, 2014, EPO, DE 102013007375 A1, Machine Translation of Description (Year: 2014).*

(Continued)

*Primary Examiner* — Paul N Dickson
*Assistant Examiner* — Matthew D Lee
(74) *Attorney, Agent, or Firm* — Cozen O'Connor (57) ABSTRACT

A multi-point link for a chassis of a motor vehicle. The multi-point link has at least one hollow profile portion including fiber-reinforced plastic and at least one load introduction element including a metallic material. The hollow profile portion, when viewed in cross section, has at least one hollow space formed as a circumferentially closed chamber. The hollow profile portion and the load introduction element are connected to one another in a common connection portion via a nondetachable glued plug-in connection. At least one stiffening element, which is fixedly connected to the hollow profile portion, is arranged in the chamber to increase the stiffness of the multi-point link.

17 Claims, 5 Drawing Sheets

(52) U.S. Cl.
CPC .. *B60G 2206/012* (2013.01); *B60G 2206/013* (2013.01); *B60G 2206/11* (2013.01); *B60G 2206/7101* (2013.01)

(58) Field of Classification Search
CPC ............ B60G 2206/7101; B60G 7/001; B60G 2206/11; B60G 2206/7102; B60G 2206/8105; B60G 2206/82092; B60G 2206/821; B60G 2400/94; F16C 7/026; F16C 2226/70; F16C 2226/40; F16B 11/008
See application file for complete search history.

(56) References Cited

U.S. PATENT DOCUMENTS

| | | | |
|---|---|---|---|
| 2008/0118303 | A1 | 5/2008 | Kennedy |
| 2013/0112309 | A1 | 5/2013 | Stewart |
| 2018/0229766 | A1* | 8/2018 | Reddehase ............. B21D 53/88 |
| 2020/0130446 | A1* | 4/2020 | Stieglitz ................. B60G 7/001 |
| 2020/0139776 | A1* | 5/2020 | Rupflin ................. B29C 66/524 |
| 2020/0369105 | A1* | 11/2020 | Stieglitz ................. B60G 7/001 |

FOREIGN PATENT DOCUMENTS

| | | | | |
|---|---|---|---|---|
| DE | 102013007375 | | 3/2014 | |
| DE | 102013007375 A1 | * | 3/2014 | ............ B29C 70/84 |
| DE | 102015214248 | | 2/2017 | |
| DE | 102015214248 A1 | * | 2/2017 | ............ B21D 39/04 |
| DE | 102016211211 A1 | * | 12/2017 | ............ B21D 39/04 |
| DE | 102016211213 | | 12/2017 | |
| EP | 0028979 | | 5/1981 | |
| EP | 1205319 A2 | * | 5/2002 | ........... B60G 21/055 |
| EP | 2266788 | | 12/2010 | |
| EP | 2711214 | | 3/2014 | |
| EP | 2722533 | | 4/2014 | |
| EP | 3260369 | | 12/2017 | |
| FR | 3024399 | | 2/2016 | |
| JP | 3705384 | | 10/2005 | |
| WO | WO 2011141538 | | 11/2011 | |
| WO | WO 2014057058 | | 4/2014 | |

OTHER PUBLICATIONS

Bauer, Axle Strut for a Vehicle, Dec. 28, 2017, EPO, DE 102016211211 A1, Machine Translation of Description (Year: 2017).*

* cited by examiner

MULTI-POINT LINK FOR A CHASSIS OF A MOTOR VEHICLE

CROSS REFERENCE TO RELATED APPLICATIONS

This is a U.S. national stage of Application No. PCT/EP2019/068470 filed Jul. 10, 2019. Priority is claimed on German Application No. DE 10 2018 213 322.0 filed Aug. 8, 2018 the content of which is incorporated herein by reference.

BACKGROUND OF THE INVENTION

1. Field of the Invention

The invention is directed to a multi-point link for a chassis of a motor vehicle, having at least one hollow profile portion comprising fiber-reinforced plastic and at least one load introduction element comprising a metallic material.

2. Description of Related Art

Multi-point links for chassis of motor vehicles having a hollow profile portion comprising a fiber-reinforced plastic and at least one load introduction element comprising a metallic material are known from the prior art. A two-point link, which is formed as a strut, is disclosed in DE 10 2010 053 843 A1. The two-point link has a hollow profile portion connected to a load introduction element, referred to as intermediate piece, via a nondetachable glued plug-in connection. The hollow profile portion comprises a fiber-reinforced plastic and is produced in a pultrusion process. The load introduction element is formed from a metallic material. A design layout of profiles of this type having a constant cross section along the longitudinal extension thereof is oriented to maximum stresses which, however, do not occur over the entire longitudinal extension but, rather, only locally. Therefore, profiles generally have the drawback that they are overdimensioned, as a rule, over much of their longitudinal extension and consequently have a greater mass than is required for the loads upon which the design layout is based.

SUMMARY OF THE INVENTION

It is an object of one aspect of the invention to provide a component part for a motor vehicle formed as a lightweight component part that at least partially comprises fiber-reinforced plastic and by which relatively high loads can be transmitted at the same time.

Accordingly, one aspect of the invention provides a multi-point link for a chassis of a motor vehicle that has at least one hollow profile portion comprising a fiber-reinforced plastic and at least one load introduction element comprising a metallic material. The hollow profile portion when viewed in cross section has at least one hollow space formed as a circumferentially closed chamber. The hollow profile portion and the load introduction element are connected to one another in a common connection portion via a nondetachable glued plug-in connection. According to one aspect of the invention, at least one stiffening element, which is fixedly connected to the hollow profile portion, is arranged in the chamber in order to increase the stiffness of the multi-point link.

Due to the stiffening element, the hollow profile portion can be stiffened in a load-oriented manner at those locations where higher stresses can occur during driving operation. Accordingly, it is not necessary that the cross section of the hollow profile portion be designed over its entire longitudinal extension for a maximum stress that only occurs at one or more locations of the hollow profile portion. In this way, an overdimensioning of the hollow profile portion can be avoided and the material usage for the multi-point link can be minimized at the same time. In the context of the present invention, "stiffness" means the resistance of the multi-point link to elastic or plastic deformation or breakage brought about in particular by a compressive force or a bending moment or torsional moment. The increased stiffness of the multi-point link is achieved in particular through an increase in the stiffness of the hollow profile portion. By the at least one stiffening element, the area moment of inertia and section modulus of the hollow profile portion is increased in the area in which the stiffening element is fixedly connected to the hollow profile portion. In this way, the hollow profile portion can be stiffened depending on the kinds of stresses and magnitudes of stresses existing at various locations along the course of its longitudinal extension.

The hollow profile portion can be straight or curved over its longitudinal extension. When the hollow profile portion is formed as a straight hollow profile portion, it preferably has a constant cross-sectional geometry extending in a columnar manner over its entire longitudinal extension. When the hollow profile portion is formed in a curved manner, it preferably has a constant radius of curvature. In particular, the hollow profile portion is formed as an open profile portion. Within the meaning of the present invention, an "open profile portion" means a profile portion which when viewed in cross section has ribs, flanges, or the like facing outward from the profile. Alternatively, the profile portion can also be formed as a closed profile portion without ribs, flanges, or the like facing outward from the profile and can have a rectangular or square tubular cross section, for example. The hollow profile portion and the at least one stiffening element can be made from the same material or from different materials.

In particular, the hollow profile portion is a portion of a straight continuous profile. Wall thicknesses of the hollow profile portion are dimensioned appreciably smaller than its cross section. The wall thicknesses of the hollow profile portion are preferably 10 to 20 percent, particularly preferably 10 to 15 percent, of the outer dimensions of the hollow profile portion when the latter has a cross-sectional geometry that can be circumscribed by a square which at least substantially contacts outer surfaces. The hollow profile portion is preferably formed as a pultruded hollow profile portion from a continuous fiber-reinforced plastic. A particularly lightweight multi-point link can be made in this way. In the present instance, a "pultruded hollow profile portion" means a hollow profile portion produced in a pultrusion process. The pultrusion process is a method for low-cost production of fiber-reinforced plastic profiles in a continuous operation. In particular, the hollow profile portion has reinforcing fibers which are distributed over the entire profile cross section and which extend in longitudinal direction of the profile portion, which brings about a high stiffness and strength in this direction. For the configuration of the hollow profile portion against kinking and/or bulging, relatively high proportions of drawn fibers are advantageously arranged in edge areas of the profile cross section so as also to run in longitudinal direction of the hollow profile portion at the same time. In particular, all of the fibers are oriented in longitudinal direction of the hollow profile portion.

In a preferred embodiment form, the pultruded hollow profile portion has a fiber volume content of approximately 65 percent. In general, a fiber volume content of between 50 percent and 75 percent is possible. Carbon fibers, glass fibers, aramid fibers, or natural fibers embedded in a plastic matrix can be used in the hollow profile portion. The matrix system advantageously comprises a vinyl ester resin because the latter can be processed favorably in the pultrusion method with very good chemical and mechanical properties. In addition, vinyl ester resin has good adhesion when combined with adhesives. Alternatively, an epoxy resin, polyester resin, phenol resin, or polyurethane resin can be used as matrix material. The continuous fiber reinforced plastic is particularly a fiber-reinforced plastic (FRP) formed from a plastic matrix with reinforcing fibers embedded therein. The reinforcing fibers are formed as continuous fibers. The fiber-reinforced plastic can be formed, for example, as a glass-fiber reinforced plastic (GRP) or carbon-fiber reinforced plastic (CRP) or as an aramid-fiber reinforced plastic (ARP). In particular, the hollow profile portion and the at least one stiffening element can be made from different materials, in particular, the load introduction element is formed from an aluminum alloy.

The at least one load introduction element is operatively, particularly rigidly, connected to the hollow profile portion and can transfer operating loads such as forces and/or moments into the hollow profile portion. In particular, the load introduction element has a joint receptacle. In particular, the load introduction element has an opening oriented perpendicular to a longitudinal direction of the hollow profile portion. The opening may be formed in the manner of a pot, for example, for receiving a joint ball of a ball stud of a ball joint. Alternatively, the opening can also be formed as a through-opening, for example, with a cylindrical through-opening for receiving a molecular joint, also referred to as clamp joint. In particular, the opening has an unmachined inner circumferential surface in the installed state.

The stiffening element can extend over the entire length, or over a part of the entire length, of the hollow profile portion in a longitudinal direction of the hollow profile portion. The stiffening element is preferably formed with constant cross section over its longitudinal extension. The stiffening element can be formed as an extruded profile, particularly an aluminum extruded profile. Alternatively, the stiffening element can also comprise a fiber-reinforced plastic with reinforcing fibers that can take the form of woven, laid or knitted fabrics, and/or as continuous fibers. According to a further alternative, the stiffening element can also be constructed to be contoured, for example, convex, in longitudinal direction thereof. Aside from a light metal, particularly aluminum, the stiffening element can also be made of steel. It is likewise conceivable to form the stiffening element from plastic foam or from a fiber-reinforced profile. In order to achieve an enhanced supporting effect of the stiffening element with favorable mass balance at the same time, the stiffening element can be formed circumferentially closed and filled with a high-strength plastic foam at the same time.

The multi-point link can be a straight two-point link, i.e., a bar-shaped link which is elongated in one spatial direction and primarily suitable for transmitting forces. Acting upon a two-point link of this kind in driving operation are primarily tensile and/or compressive forces which are introduced into the hollow profile portion via the two load introduction elements. The two-point link, which can be formed as an axle strut for guiding a rigid axle of a utility vehicle has, in particular, a hollow profile portion with a center line extending in a straight line. In particular, this center line is congruent with a straight line through center points of the two load introduction elements. In an arrangement of this kind, a loading of the straight two-point link by a compressive force, the line of action of which is congruent with the center line, leads to a pure compressive stress and a pure buckling stress within the two-point link which are not superposed by a bending stress. When the two-point link is formed as an axle strut, it can be acted upon not only by tensile, compressive and buckling stresses brought about by acceleration processes and braking processes but also by bending stresses and torsional stresses caused by rolling movements of a vehicle body. Alternatively, the multi-point link can also be a non-straight two-point link with a curved hollow profile portion, which hollow profile portion preferably has a constant radius of curvature.

Alternatively, the multi-point link can also be formed as a three-point link. A three-point link of this kind can be arranged in an upper link plane of a frame of a utility vehicle, where it serves to guide a rigid axle. Further, it is also conceivable to use a three-point link of this kind as a control arm for guiding a wheel. The three-point link preferably has two identical straight hollow profile portions which converge in a common bearing area which can be part of a central link of a rigid axle, for example. In an arrangement of this kind, the two profile portions undergo not only tensile and compressive stresses in driving operation but also bending stresses. The multi-point link may also be formed as a four-point link, for example, with two parallel straight hollow profile portions having, in each instance, two load introduction elements arranged at opposite ends of the two hollow profile portions. The hollow profile portions of a four-point link of this kind are acted upon in driving operation by tensile and compressive loads and also, due to rolling movements of the vehicle body, by bending and torsion.

The multi-point link can be in particular a built multi-point link, i.e., a multi-point link composed of a plurality of separately produced individual parts, particularly the hollow profile portion, the load introduction element and the stiffening element. This mode of construction has the advantage, for example, that the hollow profile portion can be produced with variable length so that different variants of the multi-point link can be realized in a modular manner. Owing to a load-oriented geometric configuration of the stiffening element, which is fixedly connected to the hollow profile portion, the stiffening element can be adapted in a modular construction principle of this kind to the profile portion which is produced to have variable length.

In particular, an inner circumferential surface of the chamber is operatively connected to an outer circumferential surface of the stiffening element in the area in which the hollow profile portion is stiffened by the stiffening element. In particular, the chamber is formed to be non-round when viewed in cross section. In particular, the chamber has a polygonal, preferably quadrangular, cross section. In particular, the chamber has a rectangular cross section or, as a variety of rectangular cross section, a square cross section. In particular, the chamber is closed in an airtight manner when each of two ends of the hollow profile portion is connected, respectively, to a load introduction element in each instance by a nondetachable glued plug-in connection.

The stiffening element is preferably formed as a circumferentially closed tubular profile. A circumferentially closed tubular profile of this kind has a relatively high structural stiffness at a comparatively low mass. Therefore, a significant increase in the area moment of inertia or section modulus of the hollow profile portion can be achieved through the circumferentially closed tubular profile which is arranged in the chamber and fixedly connected to the hollow profile portion at the same time. The tubular profile has in particular a non-round cross section. In particular, the tubular profile has a polygonal, particularly quadrangular, cross section. In particular, the tubular profile is formed as a rectangular tubular profile. This arrangement comprehends a square tubular profile as a variety of a rectangular tubular profile. The tubular profile can be formed as an extruded profile or a cold-drawn tubular profile or a pultruded tubular profile. Alternatively, the tubular profile can also be formed as a longitudinal seam-welded tubular profile.

The stiffening element is advisably formed as a circumferentially closed multiple-chamber profile. Owing to walls which separate the plurality of chambers of the multiple-chamber profile from one another, a stiffening element formed as a circumferentially closed multiple-chamber profile has a particularly high structural stiffness. As a result of this, a multiple-chamber profile can also contribute to a particularly great extent to increasing the area moment of inertia or section modulus of the hollow profile portion. The multiple-chamber profile is preferably formed non-round circumferentially, particularly rectangular or square. The plurality of chambers of the multiple-chamber profile can be integrated, for example, in a rectangular tubular profile. The plurality of chambers of the multiple-chamber profile can be geometrically identical or geometrically different or partially geometrically identical and partially geometrically different.

Advantageously, the stiffening element at least substantially completely fills the chamber of the hollow profile portion when viewed in cross section. By this is meant that the stiffening element at least substantially adjoins an inner wall of the chamber around the full circumference resulting in a positive engagement between the stiffening element and the hollow profile portion. When it is stated that the stiffening element at least substantially completely fills the chamber of the hollow profile portion, it is not necessarily given that the stiffening element must be formed solid. Owing to the fact that the stiffening element at least substantially completely fills the chamber, the stiffening effect of the stiffening element is already provided simply on the basis of its geometric shape. The stiffening element is preferably formed as a circumferentially closed tubular profile or as a multiple-chamber profile. In particular, the inner circumferential surface of the chamber of the hollow profile portion facing the stiffening element is the same size as an outer circumferential surface of the stiffening element.

Both the torsional stiffness and the bending stiffness of the hollow profile portion can be substantially increased in that the stiffening element fills the chamber at least substantially completely. In this way, for example, damage to the hollow profile portion of fiber-reinforced plastic due to forces associated with misuse which are introduced transverse to the longitudinal direction thereof can be prevented given a sufficient extension of the stiffening element in longitudinal direction of the hollow profile portion. Such forces associated with misuse can exercise an effect, for example, when the multi-point link is formed as an axle strut and the hollow profile portion thereof is acted upon transverse to its longitudinal direction by a force associated with misuse, for example, by an improperly applied vehicle jack. In this case, the stiffening element causes a local redirection of load into the fiber-reinforced hollow profile portion. Damage to, particularly denting of, the hollow profile portion is prevented at the same time, particularly when the stiffening element at least substantially completely fills the chamber.

The stiffening element is preferably connected by material bonding, particularly glued, to an inner circumferential surface of the chamber. The above-mentioned operative connection between the inner circumferential surface of the chamber and the outer circumferential surface of the stiffening element can be realized in a particularly effective manner by a material bond connection of this kind. Shear forces between the inner circumferential surface of the chamber and the outer circumferential surface of the stiffening element which act in longitudinal direction of the hollow profile and are brought about, for example, by bending stress on the hollow profile portion can advantageously be transmitted through the material bond connection. Further, when the stiffening element at least substantially completely fills the chamber of the hollow profile portion when viewed in a cross section, local bulging in the hollow profile portion is prevented by the material bond connection of the stiffening element to the inner circumferential surface of the chamber. If the material bond connection is formed as an adhesive connection, epoxy adhesives are contemplated as adhesives, for example. The use of an adhesive facilitates insertion of the stiffening element into the chamber of the hollow profile portion because the adhesive acts as a lubricant during this procedure.

The chamber of the hollow profile portion viewed in cross section advisably has narrow thickened portions projecting inward from an inner circumferential surface. In particular, the narrow thickened portions extend in a stripe-like manner in longitudinal direction of the hollow profile portion over the entire length thereof. When the stiffening element is glued to the inner circumferential surface of the chamber, the thickened portions serve on the one hand to achieve a minimum adhesive layer thickness and on the other hand to achieve a uniform layer thickness of the adhesive. In the present case, this is especially important because, without the thickened portions, there is the risk when inserting the stiffening element into the chamber of the hollow profile portion that the adhesive will be partially wiped off or pushed off. In particular, the thickened portions have spacer surfaces that face the stiffening element and contact the stiffening element or are slightly spaced apart from the latter. More precisely, that is, the outer circumferential surface of the stiffening element which is located outside of the thickened portions is kept at a minimum distance from the inner circumferential surface of the chamber.

In spite of this minimum distance, the stiffening element can substantially completely fill the chamber of the hollow profile portion when viewed in cross section. In particular, the thickened portions present as guide surfaces when the stiffening element is inserted into the chamber of the hollow profile portion. In particular, the thickened portions project inward from the inner circumferential surface of the chamber by less than 0.5 millimeters. In particular, when the hollow profile portion is viewed in cross section the thickened portions or spacer surfaces of the thickened portions extend by less than 5 millimeters parallel to the outer circumferential surface of the stiffening element and are accordingly kept relatively narrow. If the thickened portions are too narrow, there is the risk that they will be pushed away when the stiffening element is inserted into the chamber. If the thickened portions are too wide, this can have a negative effect on the durability of the adhesive connection between the above-mentioned joining parts because the optimal layer thickness of the adhesive is not achieved in the area of the thickened portions.

According to an alternative, the stiffening element is secured in the chamber by frictional engagement, particularly by an interference fit. A frictional engagement connection of this type can be achieved in that the stiffening element is extensively cooled prior to insertion into the chamber of the hollow profile portion. After temperature equalization, an interference fit exists between the two above-mentioned joining parts. Alternatively, it is also possible to slightly overdimension the stiffening element around the circumference and to push it into the chamber of the hollow profile portion accompanied by application of force.

The hollow profile portion is advantageously formed as a multiple-chamber hollow profile portion. This means that the hollow profile portion when viewed in cross section has at least two hollow spaces formed as circumferentially closed chambers. The area moment of inertia of the hollow profile portion can be increased by a multiple-chamber hollow profile portion depending on the geometric construction and on the arrangement of the plurality of chambers relative to one another. This has the effect particularly during a bending load and/or during a torsional load, but also during a compressive load, that higher forces and/or moments can be transmitted. In particular, the multiple-chamber hollow profile portion has in cross section at least one transverse web by which the plurality of chambers of the multiple-chamber hollow profile portion are separated from one another. Individual chambers or all chambers of the plurality of chambers of the multiple-chamber hollow profile portion can be provided with stiffening elements. A selective adjustment of the stiffness of the multi-point link is made possible in this way.

The hollow profile portion when viewed in cross section preferably has at least one outwardly protruding rib for further increasing the bending stiffness and/or torsional stiffness and/or buckling stiffness. The outwardly protruding rib extends, in particular, perpendicular to the longitudinal direction of the hollow profile portion. In particular, the at least one rib forms a rectangular or square partial cross section of the hollow profile portion. The at least one outwardly protruding rib causes an increase in the area moment of inertia and in the torsional moment of inertia of the hollow profile portion. In particular, the rib extends over the entire length of the hollow profile portion with constant cross section. In particular, the hollow profile portion when viewed in cross section has at least four outwardly protruding ribs. In particular, two of these at least four ribs are arranged opposite one another in pairs with respect to the cross section of the hollow profile portion.

An end portion of the load introduction element advantageously has a spline with teeth extending at least substantially in longitudinal direction of the hollow profile portion. In the plug-in connection in particular, a splined end portion of the load introduction element and an end portion of the hollow profile portion mutually engage in one another at least substantially by positive engagement. The load introduction element is not formed solid in the area of the spline, but rather is reduced by the volume of intermediate spaces between the teeth. In particular, aside from the teeth of the spline, only the associated end portion of the profile portion and adhesive are located in the connection portion. In particular, the teeth of the spline are glued partly to outer circumferential surfaces and partly to inner circumferential surfaces of the end portion of the hollow profile portion in the common connection portion. Owing to this type of connection, a relatively large bonding area can be realized, which meets the loadability of the connection between the spline and the end portion of the hollow profile portion.

In particular, the stiffness of the load introduction element is reduced in longitudinal direction of the hollow profile portion. During a tensile loading of the hollow profile portion, tensile forces tend to pull the end portion of the hollow profile portion out of the spline in longitudinal direction of the hollow profile portion. The reason for the reduction in stiffness of the load introduction element in the area of the spline is that, under tensile load, the teeth of the spline undergo an elastic elongation in longitudinal direction of the hollow profile portion to a greater extent than would be the case with a solid construction of the load introduction element in the area of the spline. In particular, the spline is provided with through-slots that extend therethrough in a grid-like manner perpendicular to the longitudinal direction of the hollow profile portion and which simultaneously at least partially intersect. In particular, the teeth of the spline have a length substantially at least twice as large as a maximum width of the teeth so that there results a relatively high elastic ductility of the spline in longitudinal direction of the hollow profile portion during a tensile load as well as during a compressive load. A reduction in the stresses occurring in the adhesive layer can be achieved, particularly during a tensile loading of the hollow profile portion with its two bearing areas, through the relatively thinly shaped teeth.

In particular, the teeth are formed in one piece with the load introduction element. In particular, the teeth of the spline have a rectangular or square full cross section along the longitudinal extension thereof in longitudinal direction of the end portion of the load introduction element. In particular, the through-slots at least partially run in a straight line in longitudinal direction of the hollow profile portion. In particular, the teeth of the spline at least partially adjoin through-slots by two of four longitudinal sides extending in longitudinal direction of the hollow profile portion. In particular, the teeth can adjoin through-slots by two, three, or four longitudinal sides extending in longitudinal direction of the hollow profile portion. When it is stated that through-slots which extend perpendicular to the longitudinal direction of the hollow profile portion and which simultaneously at least partially intersect extend through the end portion of the load introduction element, this means that not every through-slot need intersect any of the remaining through-slots.

The through-slots extending perpendicular to the longitudinal direction of the hollow profile portion advantageously have a constant width in a first direction and a varying width in a second direction extending perpendicular to the first direction. In particular, all of the through-slots that extend in the same direction perpendicular to the longitudinal direction of the hollow profile portion are formed identically; that is, they have a constant width or a varying width. In particular, the through-slots with constant width have a surface which is machined, preferably cut, particularly milled. In particular, the through-slots with varying width have a surface which is unmachined, particularly extruded, so that no machining costs are incurred. In particular, the through-slots with varying width have an increased width in the area of the tooth bases and/or in the area of free ends of the teeth facing the hollow profile portion.

In particular, the free ends of the teeth facing the hollow profile portion have a minimum cross-sectional area perpendicular to the longitudinal direction of the hollow profile portion. By this is meant that teeth of the spline, referring to the shape of the teeth in longitudinal direction of the hollow profile portion, have the smallest cross-sectional area at their free ends. As a result, the teeth have at their free ends an additionally reduced stiffness in longitudinal direction of the hollow profile portion. In particular, the free ends of the teeth facing the hollow profile portion have, perpendicular to the longitudinal direction of the hollow profile portion, at least in one extension direction, a greater distance from one another than is the case in at least one other area in longitudinal direction of the hollow profile portion. This is particularly because the through-slots with varying width have an increased width in the area of the free ends of the teeth. In particular, the adhesive by which the spline is connected to the end portion of the hollow profile portion has, at least partially, a greater layer thickness in the area of the free ends of the teeth. Owing to the increased adhesive layer thickness, local stresses in the adhesive layer can be reduced and distributed more uniformly on the entire connection portion.

In particular, in order to further reduce the stiffness of the spline, the teeth of the spline are at least partially narrowed in longitudinal direction of the hollow profile portion at tooth bases at which the teeth transition into solid material of the load introduction element. In particular, the tooth bases are narrowed at their longitudinal sides which adjoin through-slots with variable width. Since the hollow profile portion has a constant cross section over the longitudinal extension thereof, an at least partially thickened adhesive layer results in the area of the tooth bases. In particular, widened tooth spaces in the area of the tooth bases which result from the narrowed tooth bases are filled with adhesive. Owing to the increased adhesive layer thickness, local stresses in the adhesive layer are accordingly reduced and distributed more uniformly on the entire connection portion.

In particular, at least one tooth of the spline is formed so as to continuously narrow over its longitudinal extension toward the hollow profile portion. By this is meant that the at least one tooth has, at its tooth base, a maximum cross-sectional area which decreases continuously toward its free end until reaching a minimum at its free end. Accordingly, the at least one tooth has, at the same time, perpendicular to the longitudinal direction of the profile portion, a stiffness that continuously decreases toward the free end thereof in longitudinal direction of the common connection portion. The continuous narrowing of the at least one tooth likewise contributes to a continuous transition of the stiffness ratios in longitudinal direction of the hollow profile portion. In particular, the at least one tooth which continuously narrows toward the hollow profile portion is a corner tooth with two longitudinal sides which extend in longitudinal direction of the hollow profile portion and which adjoin through-slots.

In particular, the load introduction element is formed as a profile piece, particularly an extruded profile piece, with unmachined outer circumferential surfaces and/or inner circumferential surfaces which extend in a longitudinal direction of the profile. This has the advantage that relatively inexpensive bar stock, particularly extruded bar stock comprising an aluminum alloy, can be used as starting material for the load introduction element. The longitudinal direction of the profile piece extends in particular perpendicular to the longitudinal direction of the hollow profile portion. A cold-drawn or rolled profile piece, for example, is also a possible alternative to the extruded profile piece. In this context, outer circumferential surfaces of the profile piece can all be surfaces that are wetted when the profile piece is completely immersed in a water bath, any voids that may possibly be present having been sealed beforehand. The rest of the surfaces are inner circumferential surfaces when there are voids present, which extend in longitudinal direction of the profile piece. In the context of the present invention, a profile piece is a piece of a continuous profile. In particular, the profile piece has a constant cross-sectional geometry over its longitudinal extension.

The hollow profile portion can be inserted in longitudinal direction thereof into the spline up to the stop or can be at a distance from this maximum position. The spline is particularly advantageous during tensile and/or compressive loading, but also during torsional and/or bending loads. In particular, the length of the connection portion substantially corresponds to an outer dimension of the cross section of the hollow profile portion. This results in a relatively large length of the connection portion. This has an effect particularly during loading of the hollow profile portion with its load introduction elements at elevated temperatures when the adhesive softens somewhat under the influence of temperature and so becomes elastic. In this case, the adhesive connection is also acted upon in the area of a tooth base when the hollow profile portion and the load introduction element undergo tensile loading.

Accordingly, the relatively large length of the connection portion represents a kind of reserve load-carrying ability at relatively high ambient temperatures. The reason for this is that the adhesive is less strong and rigid at higher temperatures and tensile stresses are shifted in direction of the tooth bases. An appreciably greater length of the connection portion no longer significantly increases the load carrying capacity of the connection between the bearing area and hollow profile portion. An appreciably smaller length of the connection portion leads to a reduction in the load carrying capacity. When it is stated that the spline and the end portion of the hollow profile portion engage in one another "at least substantially" by positive engagement, this means that the two end areas do not directly adjoin one another—at least not over the entire surface—but rather have a slight clearance with respect to one another, and this slight clearance is filled with an adhesive which is distributed in particular over the entire surface. The glued plug-in connection has an epoxy adhesive in particular. Alternatively, other adhesives such as methyl methacrylate adhesives, for example, can also be employed.

As has already been stated, the spline is particularly advantageously connected to the hollow profile portion because a relatively large bonding area can be realized by gluing the teeth of the spline to outer circumferential surfaces of the end portion of the hollow profile portion and inner circumferential surfaces of the chamber at the same time. Further, the spline is also advantageous for producing the multi-point link because excess adhesive can be removed in a simple manner through the through-slots. When the end portion of the hollow profile portion is inserted into the spline, air is displaced from the through-slots. This displaced air can also easily escape via the through-slots so that entrapped air in the common connection portion of the hollow profile portion and load introduction element is prevented.

Each of two ends of the hollow profile portion is advantageously connected to a load introduction element, respectively, by a nondetachable glued plug-in connection. At the same time, the at least one stiffening element is arranged between the two plug-in connections and also at a distance from the two plug-in connections. In particular, the stiffening element is arranged between the two plug-in connections symmetrically with reference to the center. This arrangement is particularly favorable because the risk of buckling is greatest during a compressive load on the hollow profile portion in the center between the two plug-in connections.

According to a further development of the invention, each of two ends of the hollow profile portion is connected, respectively, by a nondetachable glued plug-in connection to a load introduction element. At the same time, the at least one stiffening element extends uninterruptedly over the entire length between the two plug-in connections without engaging in the plug-in connections. On the one hand, the hollow profile portion is extensively stiffened in this configuration. On the other hand, the reduced stiffening in the area of the spline which was mentioned above is preserved when the spline is formed of teeth extending in longitudinal direction of the hollow profile portion.

According to an alternative configuration, the stiffening element engages in the plug-in connection. When the spline is formed of teeth extending in longitudinal direction of the hollow profile portion, the stiffening element is formed in particular as a tubular profile or as a multiple-chamber profile in this configuration. In particular, the tubular profile or the multiple-chamber profile partially or completely circumferentially surrounds teeth of the spline. In particular, teeth of the spline are connected to the stiffening element via material bonding by means of an adhesive layer.

According to a further development, the stiffening element extends in one piece over the entire length of the hollow profile portion. This arrangement has the advantage that the hollow profile portion can be produced together with the stiffening element. In this way, a separate work step in which the stiffening element is inserted into the chamber of the hollow profile portion can be eliminated. When the spline is formed of teeth extending in longitudinal direction of the hollow profile portion, the stiffening element is also preferably formed as a tubular profile or as a multiple-chamber profile in this configuration. In particular, the tubular profile or the multiple-chamber profile also partially or completely circumferentially surrounds the teeth of the spline in this case. In particular, the teeth of the spline are connected via material bonding to the stiffening element by an adhesive layer.

Components of a damage detection system are advantageously integrated in the chamber and/or in the stiffening element. This is particularly advantageous when the stiffening element is formed as a circumferentially closed tubular profile. In this case, the components are accommodated in an installation space, which is available in any case and are protected at the same time against environmental influences, particularly when the chamber of the hollow profile portion is closed in an airtight manner. In particular, the damage detection system serves to detect damage to the multi-point link, particularly of fiber-reinforced plastic components of the multi-point link. The components can be, for example, a monitoring module and/or an electric energy storage.

In an advantageous further development of the invention, an outer stiffening element is connected by material bonding to an outer circumferential surface of the hollow profile portion in order to further increase the stiffness of the multi-point link. When one side of the outer circumferential surface of the hollow profile portion, particularly a side facing a roadway in the installed state, is covered by the outer stiffening element over its entire longitudinal extension, a stone impact protection is provided for the hollow profile portion in addition to the stiffening effect. The outer stiffening element can be exactly as long as the hollow profile portion or shorter than the hollow profile portion. In particular, the outer stiffening element is arranged circumferentially between two ribs which protrude outward when the hollow profile portion is viewed in cross section. The material bond connection is preferably formed as an adhesive connection. The outer stiffening element is preferably made from aluminum. Alternatively, the outer stiffening element can also be formed from a fiber-reinforced plastic, particularly a continuous fiber reinforced plastic.

DETAILED DESCRIPTION OF THE PRESENTLY PREFERRED EMBODIMENTS

Figure 1:
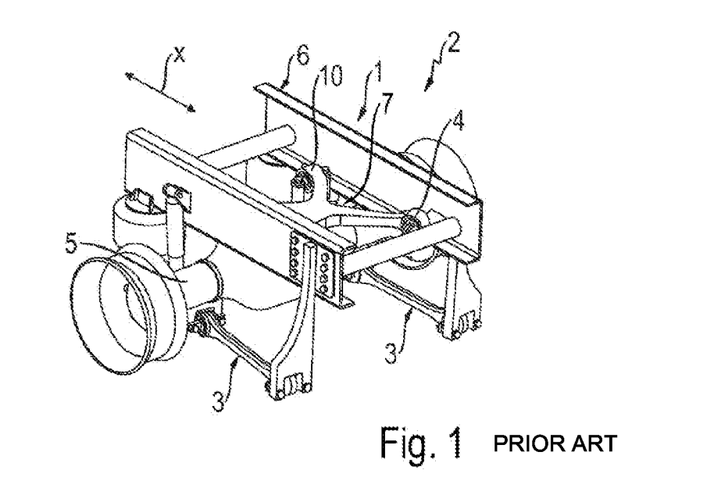
FIG. 1 is a perspective view of a chassis arrangement according to the prior art.

FIG. 1 shows a portion of a chassis 1, which is a component part of a motor vehicle, in the present case of a utility vehicle 2. The chassis 1 has two axle struts 3 arranged in a lower link plane. The two axle struts 3 are connected by one end, respectively, to a vehicle axle formed as a rigid axle 5 by means of a molecular joint. The axle struts 3 are connected by the other end indirectly to a vehicle frame 6 likewise by a molecular joint. Beside the two axle struts 3, the rigid axle 5 is guided through a four-point link 7 arranged in an upper link plane and is substantially X-shaped. The four-point link 7 combines the functions of a three-point link and a separate roll stabilizer in one component part. The four-point link 7 is connected to the vehicle frame 6 in a frame-side bearing area 4 through two molecular joints and to the rigid axle 5 in an axle-side bearing area 10 through two molecular joints. Two of the total of four molecular joints are covered by a side member of the vehicle frame 6. As has already been indicated, a three-point link could be substituted for the four-point link 7 if the chassis 1 were to have a roll stabilizer in addition.

Figure 2:
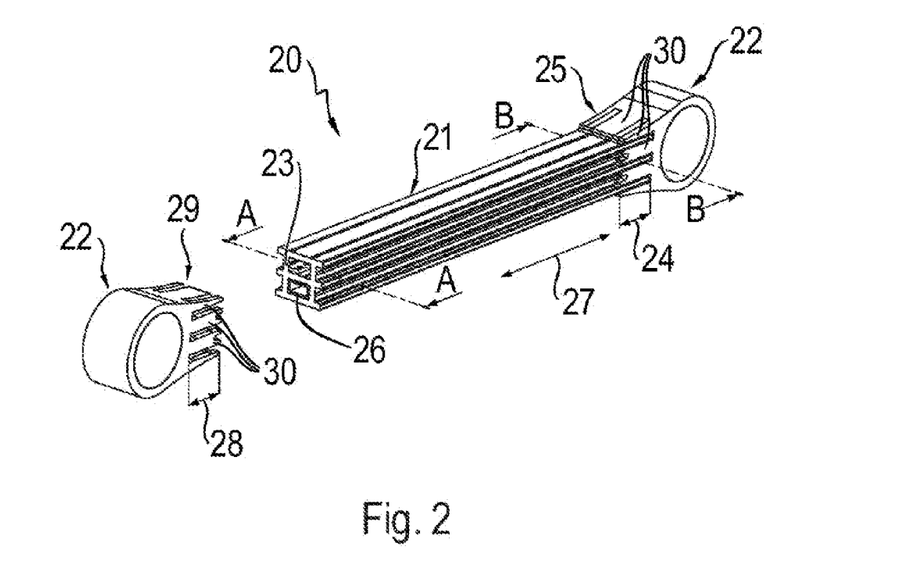
FIG. 2 is a multi-point link in a perspective, partially exploded view.

FIG. 2 shows a multi-point link 20 for a chassis of a motor vehicle, which multi-point link 20 is formed as a straight two-point link. The two-point link 20 is a built axle strut. The two-point link 20 has a straight hollow profile portion 21 comprising a fiber-reinforced plastic and a load introduction element 22 of aluminum at the two ends of the hollow profile portion 21, respectively. The hollow profile portion 21 when viewed in cross section has two hollow spaces 23 which are each formed as a circumferentially closed chamber 23. The hollow profile portion 21 and one of the two load introduction elements 22 are connected to one another in two common connection portions 24 via a nondetachable glued plug-in connection 25. A stiffening element 26 is fixedly connected to the hollow profile portion 21 and is formed with constant cross section over the longitudinal extension thereof is arranged in one of the chambers 23 in order to increase the stiffness of the multi-point link 20. The stiffening element 26 extends in a longitudinal direction 27 of the hollow profile portion 21 over the entire length of the hollow profile portion 21 and is formed as an aluminum extruded profile. Every load introduction element 22 has an end portion 28 which is formed as a spline 29 with teeth 30 extending at least substantially in longitudinal direction 27 of the hollow profile portion 21.

Figure 3:
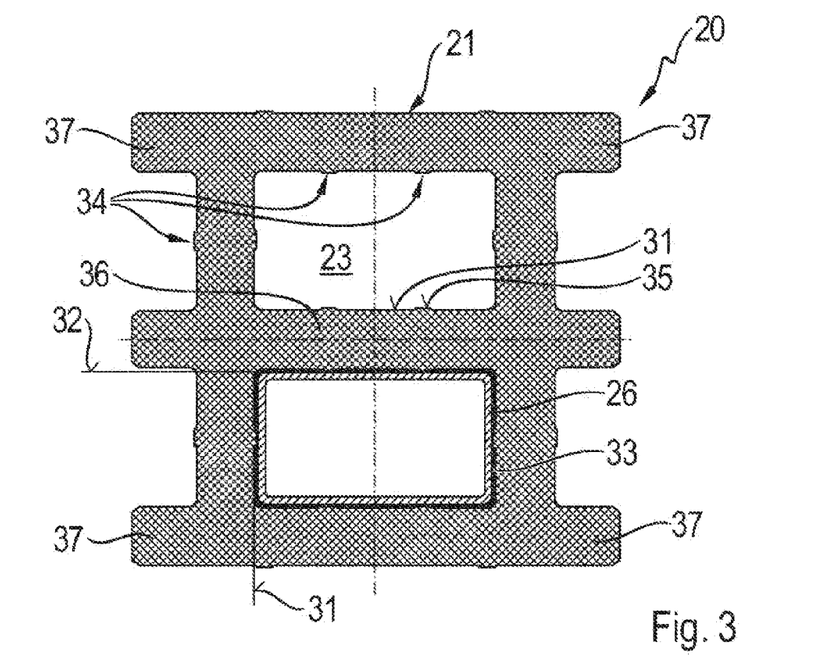
FIG. 3 is a sectional view of the multi-point link from FIG. 2 along the section line A-A indicated therein.

It can clearly be seen in FIG. 3 that the hollow profile portion 21 is formed as a multiple-chamber hollow profile portion. The multiple-chamber hollow profile portion 21 is formed as a two-chamber hollow profile portion with a lower chamber 23 and an upper chamber 23. The stiffening element 26 arranged in the lower chamber 23 of the hollow profile portion 21 is formed as a circumferentially closed rectangular tubular profile that substantially completely fills the lower chamber 23, and an intermediate space between an inner circumferential surface 31 of the chamber 23 and an outer circumferential surface 32 of the stiffening element 26 is filled with an adhesive 33. The upper chamber 23 of the hollow profile portion 21 in which no stiffening element 26 is found has a total of six narrow thickened portions 34 projecting inward from the inner circumferential surface 31 toward the center of the chamber 23. The narrow thickened portions 34 extend in a stripe-shaped manner in longitudinal direction 27 of the hollow profile portion 21 over the entire length thereof. Thickened portions 34 are arranged in the same manner in the lower chamber 23. These thickened portions 34 have spacer surfaces 35 that face the stiffening element 26, contact the stiffening element 26 or are slightly spaced apart therefrom. The upper and lower chambers 23 are separated from one another by a transverse web 36 of the hollow profile portion 21 and are at the same time arranged symmetrically with respect to a symmetry line extending in longitudinal direction of the transverse web 36. In order to further increase the stiffness of the axle strut 20, the hollow profile portion 21 when viewed in cross section has six outwardly protruding ribs 37. With reference to the center line depicted in the drawing, every two of the six ribs 37 are arranged opposite one another in pairs.

Figure 4:
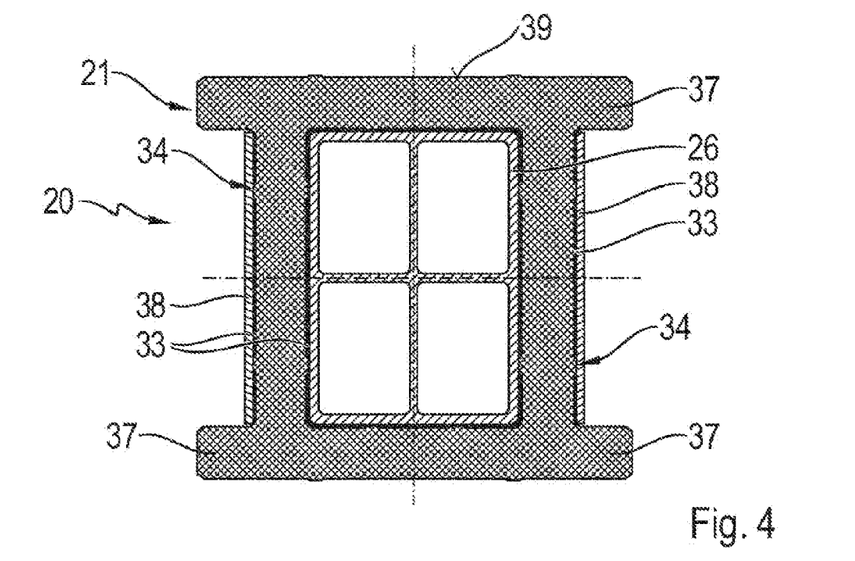
FIG. 4 is a sectional view of a hollow profile portion of a multi-point link.

FIG. 4 shows a hollow profile portion 21 of a multi-point link 20, which hollow profile portion 21 has only one chamber 23. The chamber 23 is substantially completely filled by a stiffening element 26, and the stiffening element 26 is formed as a circumferentially closed multiple-chamber profile. The stiffening element 26 is glued to an inner circumferential surface 31 of the chamber 23. In order to further increase the stiffness of the multi-point link 20, two outer stiffening elements 38 are glued to an outer circumferential surface 39 of the hollow profile portion 21.

Figure 5:
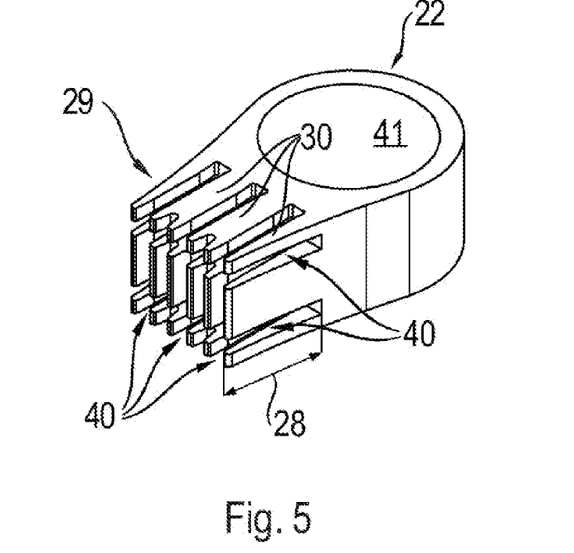
FIG. 5 is a perspective view of a load introduction element of the multi-point link from FIG. 2.

It will be apparent from FIG. 5 that through-slots 40 extend perpendicular to the longitudinal direction 27 of the hollow profile portion 21 and partially intersect one another and at the same time extend through the spline 29 of the load introduction element 22 from FIG. 2 in a grid-shaped manner. The teeth 30 of the spline 29 have a length that is approximately twice as large as a maximum width of the teeth 30. The load introduction element 22, which is formed as an extruded profile piece has an opening 41 oriented perpendicular to a longitudinal direction 27 of the hollow profile portion 21 for receiving a molecular joint, not shown.

Figure 6:
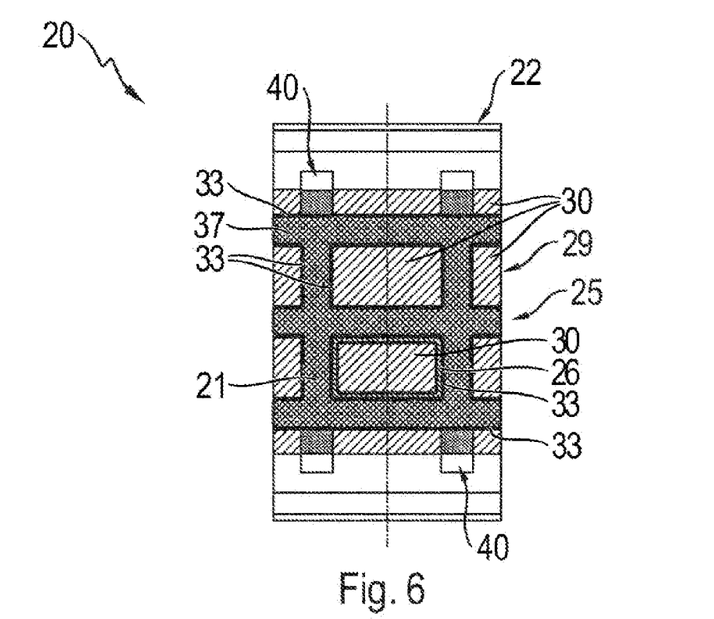
FIG. 6 is a sectional view of the multi-point link from FIG. 2 along the section line B-B indicated therein.

As will be apparent from FIG. 6, the stiffening element 26 engages in the plug-in connection 25. The stiffening element 26 is formed as a rectangular tubular profile and completely circumferentially surrounds a solid tooth 30 of the spline 29. The stiffening element 26 is glued over the entire surface to the tooth 30 which it circumferentially surrounds and at the same time to the inner circumferential surface 31 of the lower chamber 23. The upper chamber 23 is filled by a further tooth 30 of the spline 29 and by an adhesive layer 33 applied over the entire surface. The adhesive layer 33 connects the outer circumferential surface 32 of the stiffening element 26 to the inner circumferential surface 31 of the upper chamber 23 via a material bond.

Figure 7:
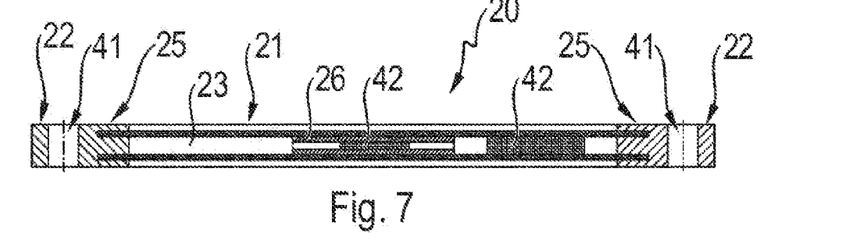
FIG. 7 is a longitudinal section through a multi-point link.

FIG. 7 shows a two-point link 20 with a hollow profile portion 21, the two ends of which are connected to a load introduction element 22, respectively, by a nondetachable glued plug-in connection 25. A stiffening element 26 is arranged in a chamber 23 of the hollow profile portion 21 centrally between the two plug-in connections 25 and simultaneously at a distance from the two plug-in connections 25. The stiffening element 26 is formed as a circumferentially closed tubular profile glued by its outer circumferential surface 32 over the entire surface to an inner circumferential surface 31 of the chamber 23. Components 42 of a damage detection system are integrated in the chamber 23 as well as in the stiffening element 26. A monitoring module is arranged in the stiffening element 26, and an electric energy storage of the damage detection system is arranged in the chamber 23.

Figure 8:
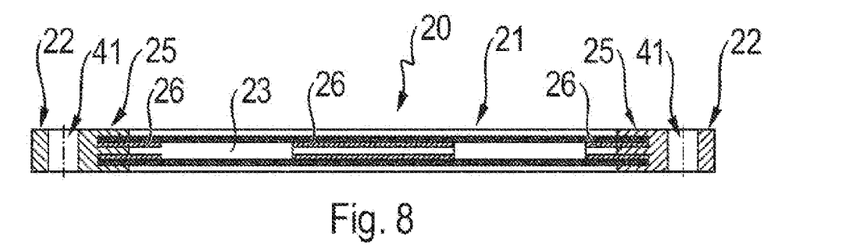
FIG. 8 is a longitudinal section through a multi-point link.

FIG. 8 shows a two-point link 20 with a hollow profile portion 21, the two ends of which are connected in each instance to a load introduction element 22 respectively by a nondetachable glued plug-in connection 25. A stiffening element 26 is arranged in a chamber 23 of the hollow profile portion 21 centrally between the two plug-in connections 25 and simultaneously at a distance from the two plug-in connections 25. Two further stiffening elements 26 engage, respectively, in one of the two plug-in connections 25 and, in so doing, surround a tooth 30 of a spline 29 of the two load introduction elements 22 in each instance. Similar to the hollow profile portion 21, the two latter stiffening elements 26 are inserted into the spline 29 almost up to the stop and, at the same time, extend by 20 millimeters out of the respective spline 29 in direction of the respective opposite load introduction element 22.

Figure 9:
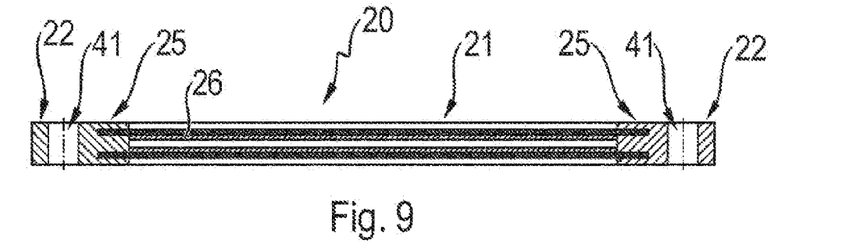
FIG. 9 is a longitudinal section through a multi-point link.

In a two-point link 20 shown in FIG. 9, each of two ends of a hollow profile portion 21 is connected in each instance to a load introduction element 22 by a nondetachable glued plug-in connection 25. At the same time, a tubular stiffening element 26 extends uninterruptedly over the entire length of the hollow profile portion 21 between the two plug-in connections 26 without engaging in the two plug-in connections 25.

Figure 10:
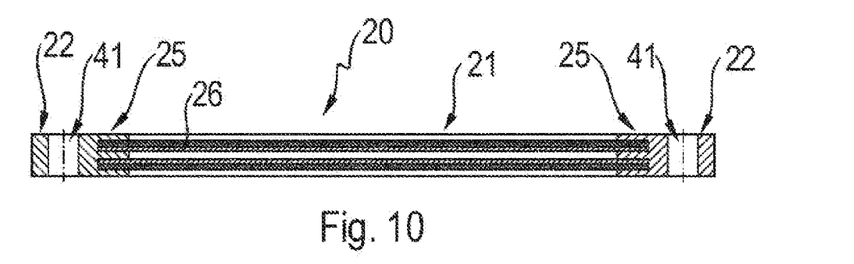
FIG. 10 is a longitudinal section through a multi-point link.

FIG. 10 shows a two-point link 20 in which each of two ends of a hollow profile portion 21 is connected to a load introduction element 22, respectively, by a nondetachable glued plug-in connection 25. A stiffening element 26, which is fixedly connected to the hollow profile portion 21 by a circumferential force fit, is arranged in a chamber 23 of the hollow profile portion 21. The stiffening element 26 extends in one piece over the entire length of the hollow profile 21 and engages in the two plug-in connections 25.

Figure 11:
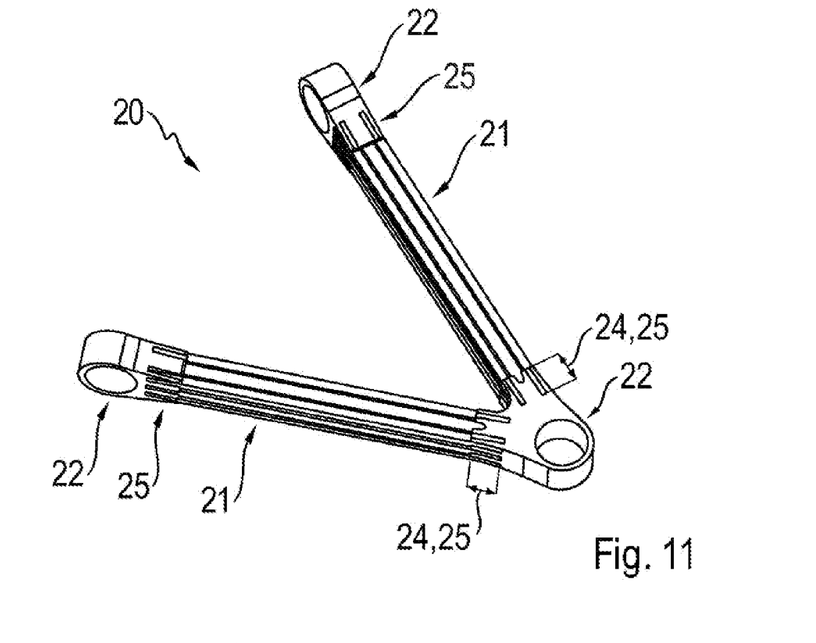
FIG. 11 is a perspective view of a multi-point link.

FIG. 11 shows a multi-point link 20 formed as a three-point link having three load introduction elements 22. The three-point link 20 further has two identical straight hollow profile portions 21 that converge in a common bearing area formed by one of the three above-mentioned load introduction elements 22. This load introduction element 22 has two splines 29 in which an end portion of one of the two hollow profile portions 21 engages, respectively, in a connection portion 24. Each hollow profile portion 21 has a chamber 23, not shown, in which is arranged a stiffening element 26, also not shown, which is fixedly connected to the hollow profile portion 21.

Figure 12:
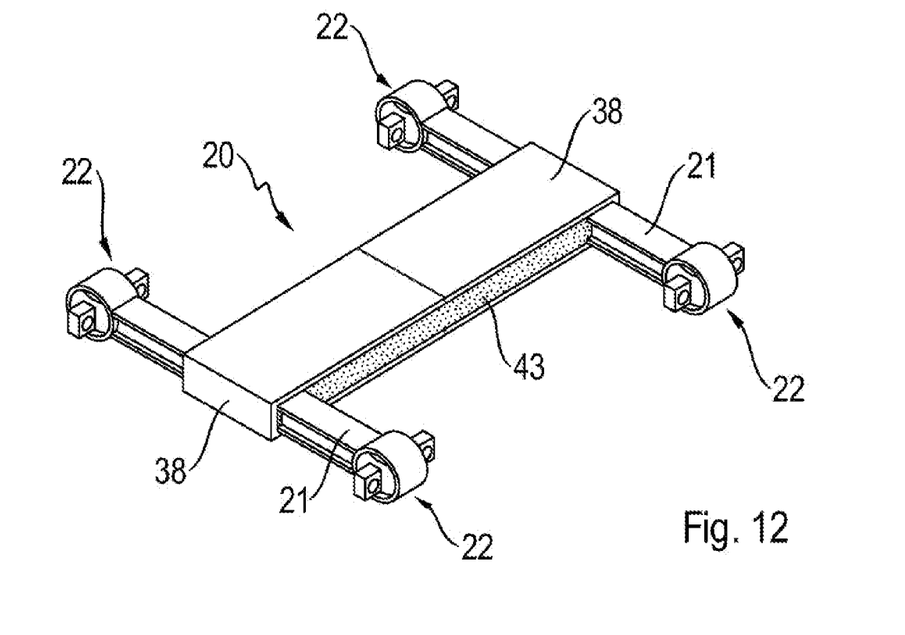
FIG. 12 is a perspective view of a multi-point link.

A multi-point link 20 shown in FIG. 12 is formed as a four-point link having two hollow profile portions 21 parallelly spaced apart from one another and fixedly connected to one another by a coupling element 43. Each hollow profile portion 21 has a chamber 23, not shown, in which is arranged a stiffening element 26, not shown, which is fixedly connected to the associated hollow profile portion 21. Further, each hollow profile portion 21 is surroundingly enclosed on three sides in a central area of its longitudinal extension by an outer stiffening element 38 and is glued to the latter. The hollow profile portions 21 are connected, respectively, on the respective fourth outer circumferential side thereof to the coupling element 43. Each outer stiffening element 38 has two brackets which are spaced apart parallel to one another, the total of four brackets meeting in pairs in the middle between the two hollow profile portions 21. Accordingly, the brackets are U-shaped when viewed in cross section. The brackets which are glued over the entire surface to the coupling element 43 on oppositely directed sides thereof are function-integrating elements of the outer stiffening elements 38. The brackets serve to reinforce the fixed connection between the hollow profile portions 21 and the coupling element 38. A load introduction element 22 with a molecular joint is arranged, respectively, at each end of the two hollow profile portions 21 of the four-point link 20.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A multi-point link for a chassis of a motor vehicle, comprising:
   at least one hollow profile portion, which when viewed in cross section has at least one hollow space formed as a circumferentially closed chamber, and comprising fiber-reinforced plastic;
   at least one load introduction element comprising a metallic material;
   at least one stiffening element formed as a circumferentially closed tubular profile is fixedly connected to the at least one hollow profile portion and arranged in the circumferentially closed chamber in order to increase a stiffness of the multi-point link; and
   a common connection portion configured to connect the at least one hollow profile portion and the at least one load introduction element via a nondetachable glued plug-in connection,
   wherein the at least one stiffening element engages in a respective one of the plug-in connections.

2. The multi-point link according to claim 1, wherein the at least one stiffening element at least substantially completely fills the circumferentially closed chamber of the at least one hollow profile portion when viewed in cross section.

3. The multi-point link according to claim 1, wherein the at least one stiffening element is connected by material bonding to an inner circumferential surface of the circumferentially closed chamber.

4. The multi-point link according to claim 1, wherein the circumferentially closed chamber of the at least one hollow profile portion viewed in cross section has narrow thickened portions projecting inward from an inner circumferential surface.

5. The multi-point link according to claim 1, wherein the at least one stiffening element is secured in the circumferentially closed chamber by frictional engagement.

6. The multi-point link according to claim 1, wherein the at least one hollow profile portion is a multiple-chamber hollow profile portion.

7. The multi-point link according to claim 1, wherein the at least one hollow profile portion when viewed in cross section has at least one outwardly protruding rib for increasing bending stiffness and/or torsional stiffness and/or buckling stiffness.

8. The multi-point link according to claim 1, wherein an end portion of a load introduction element has a spline with teeth extending at least substantially in longitudinal direction of the at least one hollow profile portion.

9. The multi-point link according to claim 1, wherein each of two ends of the at least one hollow profile portion is connected by a nondetachably glued plug-in connection to a load introduction element, respectively, and the at least one stiffening element is arranged between the two plug-in connections and, at the same time, at a distance from the two plug-in connections.

10. The multi-point link according to claim 1, wherein each of two ends of the at least one hollow profile portion is connected by a nondetachable glued plug-in connection to a load introduction element, respectively, and in that the at least one stiffening element extends uninterruptedly over an entire length between two plug-in connections without engaging in the plug-in connections.

11. The multi-point link according to claim 1, wherein the at least one stiffening element extends in one piece over an entire length of the at least one hollow profile portion.

12. The multi-point link according to claim 1, wherein components of a damage detection system are integrated in at least one of the circumferentially closed chamber and the at least one stiffening element.

13. The multi-point link according to claim 1, wherein an outer stiffening element is connected by material bonding to an outer circumferential surface of the at least one hollow profile portion in order to further increase the stiffness of the multi-point link.

14. The multi-point link according to claim 3, wherein the material bonding is glue.

15. The multi-point link according to claim 5, wherein the frictional engagement is an interference fit.

16. A multi-point link for a chassis of a motor vehicle, comprising:
   at least one hollow profile portion, which when viewed in cross section has at least one hollow space formed as a circumferentially closed chamber, and comprising fiber-reinforced plastic;
   at least one load introduction element comprising a metallic material;

at least one stiffening element fixedly connected to the at least one hollow profile portion and arranged in the circumferentially closed chamber in order to increase a stiffness of the multi-point link; and a common connection portion configured to connect the at least one hollow profile portion and the at least one load introduction element via a nondetachable glued plug-in connection, wherein the at least one stiffening element is formed as a circumferentially closed multiple-chamber profile.

17. A multi-point link for a chassis of a motor vehicle, comprising:

at least one hollow profile portion, which when viewed in cross section has at least one hollow space formed as a circumferentially closed chamber, and comprising fiber-reinforced plastic;

at least one load introduction element comprising a metallic material;

at least one stiffening element fixedly connected to the at least one hollow profile portion and arranged in the circumferentially closed chamber in order to increase a stiffness of the multi-point link; and a common connection portion configured to connect the at least one hollow profile portion and the at least one load introduction element via a nondetachable glued plug-in connection, wherein an end portion of a load introduction element has a spline with teeth extending at least substantially in longitudinal direction of the at least one hollow profile portion, wherein the tubular profile at least partially circumferentially surrounds teeth of the spline.

* * * * *